United States Patent [19]

Koyama et al.

[11] Patent Number: 4,463,116

[45] Date of Patent: Jul. 31, 1984

[54] EASILY OPENABLE LINER FOR VESSEL CLOSURES

[75] Inventors: Masayasu Koyama, Zushi; Takashi Yazaki, Hiratsuka; Isao Tanikawa, Ayase, all of Japan

[73] Assignee: Toyo Seikan Kaisha, Ltd., Tokyo, Japan

[21] Appl. No.: 439,305

[22] Filed: Nov. 4, 1982

[30] Foreign Application Priority Data

Nov. 5, 1981 [JP] Japan .............................. 56-176370

[51] Int. Cl.$^3$ ............................................. C08K 5/20
[52] U.S. Cl. ................................... 524/232; 524/322; 524/317; 524/385; 525/95; 525/98
[58] Field of Search ............... 524/232, 323, 317, 385; 525/95, 98; 215/343

[56] References Cited

U.S. PATENT DOCUMENTS 4,256,234 3/1981 Mori et al. ........................ 524/232

Primary Examiner—Joseph L. Schofer
Assistant Examiner—J. M. Reddick
Attorney, Agent, or Firm—Pennie & Edmonds

[57] ABSTRACT

Disclosed is a vessel closure provided with an easily openable liner, said liner being composed of an olefin resin or olefin resin composition comprising as a lubricant two different lubricants having different functional characteristics whereby the quantity of the lubricant immigrating to the surface of the liner is effectively controlled within a certain range at temperatures of a broad range and the opening torque of the closure is controlled at a low level at storage temperatures of a broad range.

6 Claims, 3 Drawing Figures

EASILY OPENABLE LINER FOR VESSEL CLOSURES

BACKGROUND OF THE INVENTION

1. Field of the Invention

The present invention relates to an easily openable liner for a vessel closure and to a closure in combination with the liner. More particularly, the present invention relates to a liner for a vessel closure in which immigration of a lubricant to the surface of a liner formed of a polyolefin type resin is effectively controlled within a certain range at temperatures of a broad range and the opening operation can easily be performed at temperatures of a broad range.

2. Description of the Prior Art

An olefin resin such as low density polyethylene has an appropriate cushioning property and an excellent sanitary characteristic and is widely used as a sealing liner for vessel closures. However, it has been found that when an olefin resin liner is applied to a vessel closure, various troubles arise. For example, when a vessel closure provided with an olefin resin liner is fitted to the mouth of a vessel, such as a glass bottle containing a carbonated drink, and the vessel is stored for a long time, the opening torque of the vessel closure is increased and it is often difficult for a purchaser to open the vessel closure by hand.

As means for reducing the opening torque of the vessel closure, it has been the practice to incorporate a lubricant in the olefin resin to be formed into the liner. This method, however, has not been altogether effective in that the lubricant incorporated into the olefin resin tends to immigrate to the surface of the liner in too great a quantity causing the opening torque of the vessel closure at the initial stage of sealing to be extraordinarily reduced. If the torque of a screwed vessel closure at the initial stage of sealing is excessivly small, insufficient sealing is caused at the initial stage of closing or the vessel closure can become loosened by turning of the vessel closure at the post treatment step or during the transportation, resulting in leakage of the content or intrusion of oxygen from the ambient atmosphere.

Another serious problem encountered with presently available lubricant incorporating olefin resin liners is that the immigration of the lubricant to the surface of the liner is greatly influenced by the ambient temperature. More specifically, in case of an ordinary lubricant, for example, an amide type lubricant for an olefin resin, the higher the temperature, the more accelerated is the immigration of the lubricant to the surface of the liner. At the higher temperatures, the opening torque is thus drastically reduced to cause such troubles as reduction of the seal reliability and sagging of the lubricant from the liner. Also, even though a satisfactory openability is obtained at normal temperatures, the opening torque is increased at low temperatures and opening by hand becomes difficult.

SUMMARY OF THE INVENTION

It is therefore a primary object of the present invention to provide an olefin resin liner for a vessel closure in which the quantity of a lubricant immigrating to the surface of the liner is effectively controlled within a broad range of temperatures and the opening torque is also controlled within a broad range of temperatures.

Another object of the present invention is to provide a vessel closure with a liner, in which good seal reliability and easy openability can both be attained at temperatures of a broad range and the content flavor-retaining property and sanitary characteristics are improved.

Still another object of the present invention is to provide a vessel closure with a liner, in which high-speed or large-quantity immigration of a lubricant to the surface of the liner at high temperatures is inhibited while immigration of the lubricant to the surface of the liner is increased by low temperatures.

More specifically, in accordance with the present invention, there is provided an easily openable liner for use with a vessel closure, the liner being composed of an olefin resin or olefin resin composition comprising as a lubricant a combination of (A) at least one member selected from the group consisting of compounds represented by the following formula:

$$R-X \quad (1)$$

wherein R stands for a saturated or unsaturated aliphatic hydrocarbon group, and X stands for a carboxyl group, a hydroxyl group, an amide group, an amino group or a hydrogen atom, and (B) at least one member selected from the group consisting of compounds represented by the following formula:

$$R-Y \quad (2)$$

wherein R is as defined above and Y stands for a carboxyl group, a hydroxyl group, an amide group, an amino group or a hydrogen atom, with the proviso that Y is different from X in the formula (1).

DETAILED DESCRIPTION OF THE PREFERRED EMBODIMENTS

Figure 1:
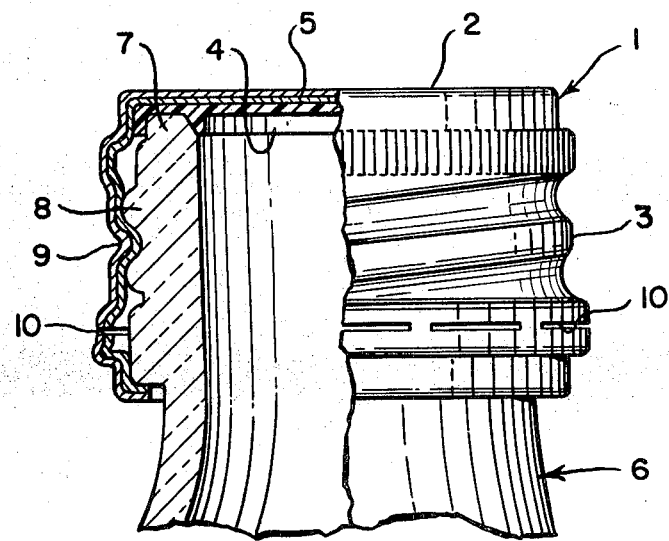
FIG. 1 is a view showing the vessel closure of the present invention together with the mouth of a vessel.

As shown in FIG. 1, the vessel closure shell 1 comprises a disc-like top plate 2 formed from a coated metal plate and a cylindrical skirt 3 depending from the periphery of the top plate 2. A disc-like liner 4 composed of an olefin resin composition is formed on the inner side of the top plate 2 and held there by an adhesive layer 5.

The periphery of the liner 4 is engaged with a circumferential mouth 7 of a vessel 6 to form a sealing structure. A screw thread 9, to be engaged with a screw thread 8 formed on the neck of the vessel, is formed on the skirt 3 of the vessel closure shell. A known pilfer-proof mechanism consisting of a perforation 10 is formed in the skirt 3 in close proximity to the lower edge thereof.

The present invention is characterized in that the liner 4 is composed of an olefin resin or olefin resin composition comprising at least one lubricant selected from the compounds (A) and at least one lubricant selected from the compounds (B). In the present invention, the lubricants (A) and (B) are selected so that they differ from each other in the kind of the functional group. For example, in the case where the first lubricant (A) is a fatty acid amide type lubricant, the second lubricant (B) may be a higher alcohol, higher amine, fatty acid or non-polar lubricant.

According to the present invention, by using in combination at least two lubricants differing in the functional group and incorporating them in an olefin resin, the quantity (bleed quantity) of the lubricant immigrating to the surface of an olefin resin liner can be controlled within a certain effective range at storage temperatures of a broad range, with the result that the frictional coefficient of the liner surface can also be maintained at a relatively low certain level at storage temperatures of a broad range.

Figure 2:
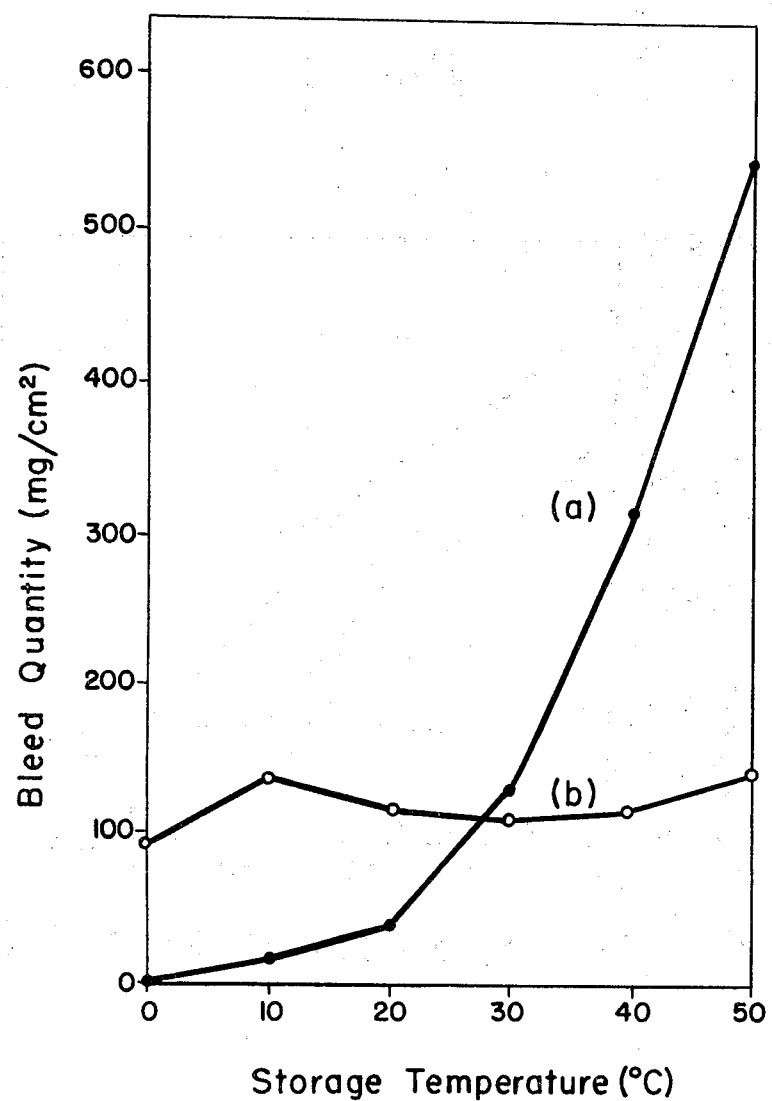
FIG. 2 is a diagram illustrating the relation between the bleed quantity of the lubricant and the storage temperature, which is observed in sheets prepared from a comparative composition comprising erucic amide incorporated in low density polyethylene for a liner and a composition of the present invention comprising erucic acid amide and lauric acid incorporated in low density polyethylene for a liner.
Figure 3:
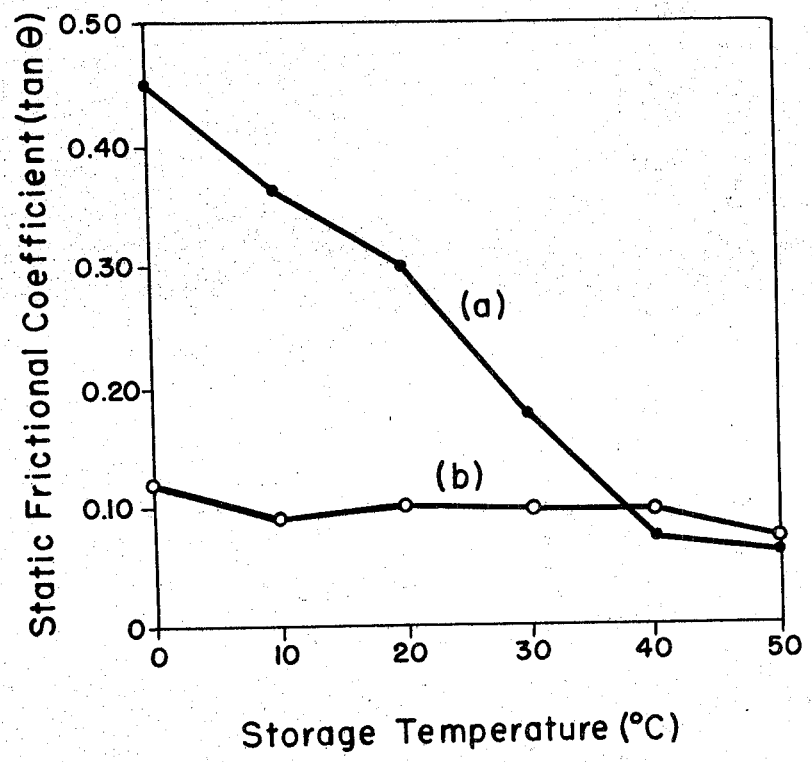
FIG. 3 is a diagram illustrating the relation between the static frictional coefficient and the storage temperature, which is observed in the same sheets as described above.

From the result shown in FIGS. 2 and 3, it is seen that in case of a known liner-forming composition (a) comprising low density polyethylene and 0.3 PHR of erucic acid amide as the lubricant, the bleed quantity of the lubricant is excessively large at higher temperatures and the bleed quantity is too small at lower temperatures, resulting in drastic increase of the static frictional coefficient. In the case of the liner-forming composition (b) of the present invention comprising low density polyethylene and 0.3 PHR of a mixture comprising erucic acid amide and lauric acid at a weight ratio of 35/65, the bleed quantity of the lubricant is controlled within a substantially certain predetermined range at not only higher temperatures but at also lower temperatures, with the result that the frictional coefficient of the surface of the liner can be controlled to a relatively low certain level.

It has not been completely determined why the immigration quantity of the lubricant to the liner surface is controlled within a substantially certain effective range at storage temperatures of a broad range by using at least two lubricants differing in the functional group. However, it is believed that this excellent effect is due, at least in part, because when different lubricants are independently incorporated into an olefin resin, the temperatures providing maximum bleed quantities greatly differ depending on the kind of the functional group. Accordingly, it is believed that when a plurality of lubricants differing in the functional group are used in combination according to the present invention, immigration of the lubricant to the liner surface is caused over a temperature range broader than in the case where a single lubricant is used. Namely, when a plurality of lubricants differing in the functional group are used, there can be attained an unexpected effect of substantially bringing into uniformity the bleed quantities at both the higher and lower temperatures.

As will be apparent from the above formulas (1) and (2), it is necessary that the lubricants used in the present invention have a specific functional group selected from carboxyl, hydroxyl, amide and amino groups or they should be non-polar lubricants. Esters, glycerides and metal soaps of fatty acids have heretofore been used as lubricants. These esters and metal soaps are not suitable for attaining the objects of the present invention because bleeding (immigration) is hardly caused at temperatures of 0° to 50° C. when they are incorporated into olefin resins.

Preferred examples of the fatty acid type lubricant are fatty acids having 6 to 27 carbon atoms, especially 12 to 22 carbon atoms, such as lauric acid, myristic acid, palmitic acid, stearic acid, margaric acid, arachidic acid, behenic acid, n-tridecenoic acid, n-pentadecenoic acid, oleic acid, linoleic acid, linolenic acid and erucic acid. The fatty acid type lubricant may be a fatty acid derived from an animal or vegetable oil or fat, a hydrogenation product thereof, or a synthetic fatty acid (inclusive of iso-fatty acid or neo-fatty acid). Furthermore, there may be used a mixed fatty acid such as soybean oil fatty acid or beef tallow fatty acid.

As the alcohol type lubricant, there can be used higher alcohols having 8 to 30 carbon atoms, especially 12 to 30 carbon atoms, such as lauryl alcohol, myristyl alcohol, cetyl alcohol, stearyl alcohol and eicosyl alcohol. Furthermore, there may be used alcohols obtained by reducing animal or vegetable oils and fats or fatty acid esters thereof or by subjecting natural waxes to pressure distillation, or synthetic alcohols.

As the amide type lubricant, there can be used fatty acid amides having 3 to 31 carbon atoms, particularly 12 to 22 carbon atoms, such as amides and diethanol amides of the above-mentioned fatty acids.

As the amine type lubricant, there can be used primary, secondary and tertiary alkyl and alkenyl amines having 8 to 25 carbon atoms, such as lauryl amine, myristyl amine, cetyl amine and stearyl amine.

As the non-polar lubricant, there can be used paraffinic hydrocarbons having 7 to 25 carbon atoms, such as decane, tridecane, tetradecane, eicosane and 2-methyldecane.

The foregoing compounds have been mentioned only for illustration, and it should be understood that other compounds can be used as well as mixtures of two or more of these compounds as long as the above-mentioned requirements are satisfied.

It is preferred that an amide type lubricant be used as one lubricant (A), and a combination of an amide type lubricant with a fatty acid type lubricant and/or a hydrocarbon type lubricant is especially preferred. A combination of an amide type lubricant with an alcohol type lubricant comes next. As the combination not including an amide type lubricant, a combination of a fatty acid type lubricant with an alcohol type lubricant and/or a hydrocarbon type lubricant can be used. A combination of an alcohol type lubricant with a hydrocarbon type lubricant can also be used if desired.

In the present invention, it is preferred that the above-mentioned lubricants (A) and (B) be used at an (A)/(B) weight ratio of from 5/95 to 95/5, especially from 25/75 to 75/25. It also is preferred that the lubricant mixture be used in an amount of 0.05 to 5 parts by weight, especially 0.1 to 3 parts by weight, per 100 parts by weight of the olefin resin or olefin resin composition.

If the mixing ratio of the lubricants (A) and (B) is outside the above-mentioned range, controlling the quantity of the lubricant immigrating to the liner surface within a certain range at low and high temperatures, becomes difficult. If the total amount of the lubricants (A) and (B) is too small and below the above-mentioned range, bleedout of the lubricant in an amount sufficient to reduce the opening torque even after the long-period storage becomes difficult, and if the total amount of the lubricants (A) and (B) is too large and exceeds the above-mentioned range, the opening torque at the initial stage is too low and the seal reliability is reduced.

Low density, medium density and high density polyethylenes, isotactic polypropylene, a crystalline ethylene/propylene copolymer and blends thereof are preferably used as the olefin resin in the present invention. The most preferred olefin resins are the above-mentioned polyethylenes and a crystalline ethylene copolymer comprising 1 to 5 mole % of other olefin such as propylene or butene-1 with the remainder being ethylene. The olefin resin may contain 0.5 to 55 mole % of an ethylenically unsaturated monomer other than the olefin. For example, an ethylene/vinyl acetate copolymer, an ethylene/acrylic acid copolymer and an ion-crosslinked ethylene copolymer (ionomer) can be used for attaining the objects of the present invention. The molecular weight of the olefin resin is not particularly critical, so far as it has a film-forming molecular weight. It is especially preferred that an olefin resin having a melt index (MI) of 0.01 to 100 be used.

When a combination of an amide type lubricant with another lubricant is used as the lubricant, if only this combination is incorporated into the above-mentioned olefin resin alone, the effect of controlling the opening torque stably at temperatures of a broad range can be attained. In order to further enhance this effect or to use other combinations of lubricants effectively, it is possible to use the olefin resin in the form of a composition containing other components. For example, the above-mentioned olefin resin can be used in the form of a mixture with at least one member selected from lowly crystalline and amorphous ethylene copolymers and conjugated diene copolymers. As the lowly crystalline or amorphous ethylene copolymer, there can be used a copolymer of ethylene with other olefin having a crystallization degree lower than 10%. As suitable examples of the olefin other than ethylene, there can be mentioned propylene and butene-1. This copolymer may further comprise a non-conjugated diene such as 1,4-hexadiene, ethylidene or norbornene. Preferred examples of the ethylene copolymer are copolymers comprising 95 to 40 mole % of ethylene and 5 to 60 mole % of propylene or butene-1, optionally with 1 to 5 mole % of a non-conjugated diene, especially ethylene/propylene copolymer rubbers and ethylene/propylene/diene terpolymer rubbers.

It is preferred that the molecular weight of the copolymer be 5,000 to 2,000,000, especially 10,000 to 1,000,000.

The diene copolymer to be used as the lubricating property-enduring agent can be a homopolymer of a conjugated diene and a copolymer of a conjugated diene with other ethylenically unsaturated monomer. As the conjugated diene, dienes represented by the following formula can be used:

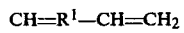

where $R^1$ stands for a hydrogen atom, a halogen atom or an alkyl group having up to 4 carbon atoms, especially butadiene, isoprene and chloroprene. As the ethylenically unsaturated monomer, there can be mentioned vinyl aromatic monomers such as styrene, vinyltoluene and α-methylstyrene, ethylenically unsaturated carboxylic acids such as acrylic acid, methacrylic acid, maleic acid, maleic anhydride, fumaric acid, itaconic anhydride, crotonic acid and citraconic acid, esters, amide, hydroxyalkyl ester and aminoalkyl esters of these carboxylic acids, vinyl ester monomers such as vinyl acetate, vinyl formate and vinyl propionate, ethylenically unsaturated nitriles such as acrylonitrile and methacrylonitrile, vinyl ethers such as methylvinyl ether and ethylvinyl ether, and vinyl halides such as vinyl chloride and vinylidene chloride. These monomers may be used singly or in the form of a mixture of two or more of them. From the viewpoint of the lubricating property-enduring effect, it is preferred that the diene copolymer should contain at least 10% by weight, especially at least 20% by weight, of the conjugated diene units.

Preferred examples of the diene copolymer include natural and synthetic rubbers such as cis-1,4-polybutadiene, polyisoprene, styrene/butadiene copolymer rubbers, nitrile/butadiene copolymer rubbers and polychloroprene, and thermoplastic butadiene copolymers and thermoplastic isoprene copolymers. A styrene/butadiene or isoprene block copolymer or styrene/butadiene or isoprene/styrene block copolymer containing 15 to 40% by weight of butadiene or isoprene units is preferred as the thermoplastic butadiene or isoprene copolymer.

It is ordinarily preferred that the molecular weight of the diene copolymer be 10,000 to 1,000,000.

The lowly crystalline or amorphous ethylene copolymer may be incorporated into the basic olefin resin in an amount of 1 to 70% by weight, especially 5 to 60% by weight, based on the olefin resin, and the diene-containing copolymer may be incorporated in an amount of up to 45% by weight, especially 5 to 30% by weight, based on the olefin resin.

In order to color or opacify the liner, a white pigment such as titanium dioxide, a coloring pigment such as carbon black, red iron oxide or Tartrazine Lake or a filler such as calcium carbonate, talc, clay or barium sulfate may be incorporated. Furthermore, a blocking preventing agent such as silica may be added to prevent blocking or an antioxidant such as a sterically hindered phenol may be added to prevent thermal deterioration at the liner-forming step or the sterilizing step.

Formation of the olefin resin composition into a liner can be accomplished by known means. For example, a liner can be formed in situ by melt-kneading the respective components described above, extruding a predetermined amount of the melt to the inner side of the vessel closure shell and mold-pressing the resin composition under cooling. According to this forming method, a thick rising portion suitable for the sealing property is formed along the periphery of the liner to be engaged with the mouth of a vessel, and in this point, the above forming method is advantageous. Furthermore, there may be adopted a method in which the lubricant-incorporated olefin resin composition is molded into a preform having a disc-like or other shape instead of being melt-extruded into the vessel closure shell. The preform is placed in the vessel closure shell, and the assembly is heated and the preform is formed into a liner.

Still further, in the present invention, there may be adopted a method in which the olefin resin composition of the present invention is formed into a sheet by melt extrusion or roll molding, the sheet is punched into a disc and the formed discs are applied as the liner one by one into vessel closure shells. In this method, the liner-forming sheet may have a single layer structure composed of the above-mentioned olefin resin composition or may be a laminate. With a laminate, the surface to be engaged with the mouth of a vessel is composed of a layer of the above-mentioned olefin resin composition. This laminate may be prepared by bonding a substrate such as paper, an aluminum foil, a foamed sheet or a film of polyester, such as that manufactured and sold under the trademark MYLAR, to a layer of the above-mentioned olefin resin composition by such means as dry lamination, extrusion coating or co-extrusion.

The metal blank for formation of the vessel closure shell may be a plate of a light metal such as aluminum or may be deposited steel plates and surface-treated steel plates such as a tin-plated steel plate and an electrolytically chromate-treated steel plate (tin-free steel plate). The metal blank may be coated with a known protective paint such as an epoxy-phenolic paint.

Formation of the coated metal plate into a shell can be accomplished by drawing, deep drawing, draw-ironing and press molding. Bonding of the liner to the inner side of the vessel closure shell can be accomplished through a layer of an adhesive paint comprising oxidized polyethylene or an acid-modified olefin resin. The vessel closure shell can also be formed of a plastic material.

The present invention is applied to vessel closures of the type in which the opening operation of the closure is accomplished by relative rotation between the closure and the vessel. For example, the screw may include a screw cap, a pilfer-proof cap, a lug cap, a press-on twist-off cap and a twist crown. Fitting or sealing of the vessel closure to the mouth or neck of a vessel is accomplished by roll-on (screwing by a threaded roller), press-on or screw-on.

In accordance with the teachings of the present invention, the following Examples are given.

(1) Measurement of Bleed Quantity of Lubricant to Surface of Sheet

The specimen was promptly cleaned with ethyl alcohol just after the preparation of the specimen. The specimen was then stored under predetermined conditions for a predetermined time. The weight of the specimen was then precisely measured. Next, the surface of the specimen was cleaned with ethyl alcohol and the weight of the specimen was precisely measured again. The difference between the weight of the specimen before cleaning with ethyl alcohol and the weight of the specimen after cleaning with ethyl alcohol was designated as the bleed quantity of the lubricant. The bleed quantity was expressed in the unit of milligrams per square meter of the sheet.

(2) Measurement of Static Frictional Coefficient

The specimen was promptly cleaned with ethyl alcohol just after the preparation of the specimen. The specimen was then stored under predetermined conditions and the static frictional coefficient was measured at predetermined intervals according to the method of ASTM D-3248. The static frictional coefficient was expressed by tan $\theta$ in which $\theta$ represents the angle observed when the thread moved by 0.05 mm.

The measurement results are shown in Table 1. It will readily be understood that in the product of the present invention, the deviation range of both the bleed quantity and the static frictional coefficient at temperatures of a broad range was very narrow and the static frictional coefficient was controlled to a low level.

TABLE 1

| | 0° C. | | 10° C. | | 23° C. | | 37° C. | | 50° C. | |
|---|---|---|---|---|---|---|---|---|---|---|
| | Bleed* Quantity | Frictional** Coefficient | Bleed Quantity | Frictional Coefficient | Bleed Quantity | Frictional Coefficient | Bleed Quantity | Frictional Coefficient | Bleed Quantity | Frictional Coefficient |
| Comparative Product | | | | | | | | | | |
| 1 Day | 0 | 0.377 | 0 | 0.349 | 0 | 0.316 | 44 | 0.125 | 97 | 0.109 |
| 1 Week | 5 | 0.366 | 6 | 0.328 | 25 | 0.215 | 88 | 0.122 | 182 | 0.070 |
| 2 Weeks | 12 | 0.332 | 12 | 0.327 | 42 | 0.190 | 130 | 0.096 | 235 | 0.067 |
| 4 Weeks | 14 | 0.319 | 18 | 0.315 | 65 | 0.143 | 205 | 0.066 | 310 | 0.060 |
| Product of Present Invention | | | | | | | | | | |
| 1 Day | 11 | 0.226 | 15 | 0.200 | 11 | 0.224 | 28 | 0.139 | 33 | 0.132 |
| 1 Week | 32 | 0.183 | 60 | 0.150 | 42 | 0.162 | 87 | 0.110 | 103 | 0.100 |
| 2 Weeks | 80 | 0.157 | 122 | 0.112 | 83 | 0.123 | 119 | 0.083 | 151 | 0.080 |
| 4 Weeks | 161 | 0.121 | 198 | 0.090 | 167 | 0.100 | 191 | 0.066 | 235 | 0.063 |

*Bleed Quantity (mg/m$^2$)
**Static Frictional Coefficient (tan $\theta$)

EXAMPLE 1

A composition comprising low density polyethylene and 0.3% by weight, based on the polyethylene, or erucic acid amide (the composition for the comparative product) and a composition comprising low density polyethylene and 0.3% by weight, based on the polyethylene, of a mixture containing erucic acid amide and lauric acid at a weight ratio of 1/2 (the composition for the product of the present invention) were separately kneaded and pelletized. With each composition, the pellet was preheated at 160° C. under a pressure of 10 Kg/cm$^2$ for 2 minutes in a hot press. Then, the preheated pellet was heated and compressed under a pressure of 100 Kg/cm$^2$ for 2 minutes to form a sheet having a thickness of 1 mm. The sheet was cut into an appropriate length to obtain specimens to be used for the measurement of the bleed quantity and the frictional coefficient. The tests were carried out according to the following methods.

EXAMPLE 2

Specimens were prepared in the same manner as described in Example 1 by using a composition comprising low density polyethylene and 0.3 PHR of erucic acid amide (the composition for the comparative product) and a composition comprising low density polyethylene and 0.3 PHR of a mixture containing erucic acid amide and lauryl alcohol at a weight ratio of 1/2 (the composition for the product of the present invention). The bleed quantity and static frictional coefficient were determined according to the methods described in Example 1. The results obtained are shown in Table 2. It will readily be understood that in the product of the present invention, the bleed quantity of the lubricant could be controlled within a narrower range and the static frictional coefficient could be maintained at a lower level at temperatures of a broad range than in the convention product.

TABLE 2

| | Measurement Results | | | | | | | | | |
|---|---|---|---|---|---|---|---|---|---|---|
| | 0° C. | | 10° C. | | 23° C. | | 37° C. | | 50° C. | |
| | Bleed* Quantity | Frictional** Coefficient | Bleed Quantity | Frictional Coefficient | Bleed Quantity | Frictional Coefficient | Bleed Quantity | Frictional Coefficient | Bleed Quantity | Frictional Coefficient |
| | | | | | Comparative Product | | | | | |
| 1 Day | 0 | 0.377 | 0 | 0.349 | 0 | 0.316 | 44 | 0.125 | 97 | 0.109 |
| 1 Week | 5 | 0.366 | 6 | 0.328 | 25 | 0.215 | 88 | 0.122 | 182 | 0.070 |
| 2 Weeks | 12 | 0.332 | 12 | 0.327 | 42 | 0.190 | 130 | 0.096 | 235 | 0.067 |
| 4 Weeks | 14 | 0.319 | 18 | 0.315 | 65 | 0.143 | 205 | 0.066 | 310 | 0.060 |
| | | | | | Product of Present Invention | | | | | |
| 1 Day | 13 | 0.222 | 19 | 0.211 | 12 | 0.231 | 31 | 0.170 | 35 | 0.161 |
| 1 Week | 43 | 0.178 | 57 | 0.138 | 51 | 0.140 | 82 | 0.109 | 102 | 0.090 |
| 2 Weeks | 77 | 0.155 | 128 | 0.105 | 98 | 0.120 | 124 | 0.079 | 161 | 0.071 |
| 4 Weeks | 158 | 0.110 | 203 | 0.087 | 170 | 0.098 | 195 | 0.064 | 220 | 0.060 |

*Bleed Quantity (mg/m$^2$)
**Static Frictional Coefficient (tan $\theta$)

EXAMPLE 3

An ordinary paint was roll-coated onto an aluminum plate having a thickness of 0.25 mm and this was heated at 200° C. for 10 minutes to form a coated plate. The coated plate was press-molded into a closure shell with the coated surface located on the inner side. The shell was then heated at 150° C. by a high frequency induction heating device, and a thermoplastic resin composition shown in Table 3 was melt-extruded by an extruder and thrown into the inner side of the closure shell by a rotary blade. The extrudate was then mold-pressed to obtain a lined closure. The weight of the liner resin was 0.75 g. The closure was stored at 0°, 10°, 23° or 50° C.

TABLE 3

| Liner Resin Composition (parts by weight) | | |
|---|---|---|
| | Comparative Product | Product of Present Invention |
| low density polyethylene | 100 | 100 |
| ethylene/propylene/diene copolymer | 20 | 20 |
| styrene/isoprene/styrene block copolymer | 5 | 5 |
| white pigment | 0.12 | 0.12 |
| erucic acid amide | 0.30 | 0.10 |

TABLE 3-continued

| Liner Resin Composition (parts by weight) | | |
|---|---|---|
| | Comparative Product | Product of Present Invention |
| hydrocarbon compound | — | 0.20 |

A plurality of glass bottles to which the above closures were to be attached were filled with 1000 ml of a carbonated drink (4 parts by volume of gas). Each bottle was sealed with the closure which had been allowed to stand for 1 week after the preparation. Then each sealed bottle was vibrated at an acceleration of 1 G with amplitude of 3 mm in either the longitudinal direction or the lateral direction for 30 minutes. Different bottles were stored in a normal vertical position in a storage chamber maintained at 0°, 10°, 23° or 50° C. At predetermined intervals, the closure opening test was carried out by using a torque meter. Some bottles were stored in a normal vertical position at the above-mentioned temperature for 1 month, and the closure opening property was evaluated by a panel consisting of 25 experts. The results obtained are shown in Table 4.

It will readily be understood that the product of the present invention was excellent in the openabiliy especially at low temperatures.

TABLE 4

| | Measurement Results | | | | | | | | | |
|---|---|---|---|---|---|---|---|---|---|---|
| | 0° C. | | 10° C. | | 23° C. | | 37° C. | | 50° C. | |
| | Bleed* Quantity | Frictional** Coefficient | Bleed Quantity | Frictional Coefficient | Bleed Quantity | Frictional Coefficient | Bleed Quantity | Frictional Coefficient | Bleed Quantity | Frictional Coefficient |
| | | | | | Comparative Product | | | | | |
| 1 Day | 0 | 0.372 | 0 | 0.353 | 0 | 0.319 | 47 | 0.138 | 64 | 0.120 |
| 1 Week | 4 | 0.363 | 4 | 0.343 | 23 | 0.222 | 89 | 0.101 | 149 | 0.066 |
| 2 Weeks | 9 | 0.342 | 10 | 0.333 | 31 | 0.201 | 110 | 0.081 | 184 | 0.063 |
| 4 Weeks | 13 | 0.320 | 13 | 0.315 | 44 | 0.151 | 185 | 0.060 | 249 | 0.057 |
| | | | | | Product of Present Invention | | | | | |
| 1 Day | 47 | 0.177 | 51 | 0.168 | 44 | 0.138 | 42 | 0.122 | 57 | 0.125 |
| 1 Week | 128 | 0.162 | 146 | 0.150 | 102 | 0.100 | 85 | 0.115 | 112 | 0.077 |
| 2 Weeks | 165 | 0.152 | 172 | 0.121 | 130 | 0.098 | 111 | 0.083 | 141 | 0.070 |
| 4 Weeks | 200 | 0.121 | 219 | 0.101 | 173 | 0.088 | 161 | 0.162 | 215 | 0.060 |

*Bleed Quantity (mg/m$^2$)
**Static Frictional Coefficient (tan $\theta$)

| | 0° C. | | 10° C. | | 23° C. | | 37° C. | | 50° C. | |
|---|---|---|---|---|---|---|---|---|---|---|
| | Opening* Torque | Opening** Ratio | Opening Torque | Opening Ratio | Opening Torque | Opening Ratio | Opening Torque | Opening Ratio | Opening Torque | Opening Ratio |
| | | | | | Comparative Product | | | | | |
| 1 Day | 44.6 | 28 | 31.1 | 80 | 26.0 | 96 | 13.1 | 100 | 9.7 | 100 |
| 1 Week | 45.6 | 20 | 37.9 | 56 | 27.3 | 92 | 13.8 | 100 | 10.4 | 100 |
| 2 Weeks | 47.0 | 12 | 38.6 | 56 | 28.0 | 92 | 14.0 | 100 | 10.9 | 100 |
| 4 Weeks | 48.3 | 8 | 38.6 | 48 | 28.7 | 92 | 14.5 | 100 | 11.0 | 100 |

TABLE 4-continued

| | | | | Measurement Results | | | | | |
|---|---|---|---|---|---|---|---|---|---|
| | | | | Product of Present Invention | | | | | |
| 1 Day | 22.2 | 100 | 17.8 | 100 | 14.9 | 100 | 13.0 | 100 | 10.9 | 100 |
| 1 Week | 27.6 | 100 | 25.4 | 100 | 16.7 | 100 | 13.9 | 100 | 11.2 | 100 |
| 2 Weeks | 28.8 | 100 | 25.7 | 100 | 17.1 | 100 | 14.1 | 100 | 11.7 | 100 |
| 4 Weeks | 29.1 | 100 | 27.1 | 100 | 18.6 | 100 | 14.8 | 100 | 11.7 | 100 |

*Opening Torque (Kg · cm)
**Opening Ratio (%)

We claim:

1. An easily openable liner for a vessel closure, said liner comprising an olefin resin or olefin resin composition and as a lubricant a combination of (A) at least one member selected from the group consisting of compounds represented by the formula:

$$R-X \qquad (1)$$

wherein R stands for a saturated or unsaturated hydrocarbon group having 3-31 carbon atoms and X stands for an amide group, and (B) at least one member selected from the group consisting of compounds represented by the following formula:

$$R-Y \qquad (2)$$

wherein R stands for a saturated or unsaturated aliphatic group having 12-27 carbon atoms and Y stands for a carboxyl group or a hydroxyl group having 8-30 carbon atoms with the proviso that Y is different from X in the formula (1), and that the A/B weight ratio is 5/95 to 95/5.

2. A liner as set forth in claim 1, wherein the compound of the formula (1) is an amide type lubricant and the compound of the formula (2) is a fatty acid, alcohol, amine or hydrocarbon type lubricant.

3. A liner as set forth in claim 1, wherein the compound of the formula (1) is a fatty acid amide type lubricant having 12 to 22 carbon atoms and the compound of the formula (2) is a fatty acid type lubricant having 12 to 27 carbon atoms.

4. A liner as set forth in claim 1, wherein the olefin resin composition is a composition comprising 99 to 30% by weight of a crystalline polyolefin, 1 to 70% by weight of a lowly crystalline or amorphous copolymer of ethylene with other olefin and up to 29% by weight of a diene copolymer.

5. A liner as set forth in any one of claims 1–4, wherein a lubricant comprising the compound of the formula (1) and the compound of the formula (2) at a weight ratio of from 10/90 to 90/10 is incorporated in an amount of 0.05 to 5 parts by weight per 100 parts by weight of the olefin resin or olefin resin composition.

6. A vessel closure having an easily openable liner, said liner comprising an olefin resin or olefin resin composition and as a lubricant a combination of (a) at least one member selected from the group consisting of compounds represented by the following formula:

$$R-X \qquad (1)$$

wherein R stands for a saturated or unsaturated aliphatic hydrocarbon group having 12-22 carbon atoms and X stands for an amide group, and (B) at least one member selected from the group consisting of compounds represented by the following formula:

$$R-Y \qquad (2)$$

wherein R is as defined above, and Y stands for a hydroxyl group having 12-30 carbon atoms, with the proviso that Y is different from X in the formula (1), and the A/B weight ratio is 25/75 to 75/25.

* * * * *